(12) United States Patent
MacGregor et al.

(10) Patent No.: US 7,918,462 B1
(45) Date of Patent: Apr. 5, 2011

(54) SYSTEM AND METHOD FOR FACILITATING TURBINE LABYRINTH PACKING

(75) Inventors: Donna L. MacGregor, Marion, OH (US); Thomas W. Rambin, Marion, OH (US)

(73) Assignee: Star Field Fit, Inc., Marion, OH (US)

( * ) Notice: Subject to any disclaimer, the term of this patent is extended or adjusted under 35 U.S.C. 154(b) by 182 days.

(21) Appl. No.: 12/135,160

(22) Filed: Jun. 7, 2008

Related U.S. Application Data

(63) Continuation of application No. 11/673,814, filed on Feb. 12, 2007.

(60) Provisional application No. 60/773,020, filed on Feb. 14, 2006.

(51) Int. Cl.
*F16J 15/46* (2006.01)
*F16J 15/447* (2006.01)
(52) U.S. Cl. ......... 277/413; 277/416; 277/421; 277/583
(58) Field of Classification Search .............. 277/413, 277/421, 583, 416
See application file for complete search history.

(56) References Cited

U.S. PATENT DOCUMENTS

| | | | | |
|---|---|---|---|---|
| 632,442 A * | 9/1899 | Byle et al. | | 277/583 |
| 943,023 A * | 12/1909 | Johnson | | 277/534 |
| 1,100,829 A * | 6/1914 | Joseph | | 138/119 |
| 1,164,303 A * | 12/1915 | Nicewarner | | 138/119 |
| 1,301,354 A * | 4/1919 | Baird | | 138/119 |
| 2,401,108 A * | 5/1946 | Roberts | | 277/558 |
| 2,832,618 A * | 4/1958 | Knoll et al. | | 277/583 |
| 2,943,874 A * | 7/1960 | Valdi et al. | | 277/346 |
| 3,302,952 A * | 2/1967 | Michielin | | 277/583 |
| 3,374,806 A * | 3/1968 | Skinner | | 138/119 |
| 3,536,559 A * | 10/1970 | Herbert et al. | | 156/429 |
| 3,642,291 A * | 2/1972 | Zeffer et al. | | 277/583 |
| 3,722,895 A * | 3/1973 | Mevissen | | 277/583 |
| 3,788,651 A * | 1/1974 | Brown et al. | | 277/646 |
| 3,856,052 A * | 12/1974 | Feucht | | 138/119 |
| 3,897,088 A * | 7/1975 | Beinhaur | | 285/97 |
| 3,999,430 A * | 12/1976 | Parduhn | | 73/146.3 |
| 4,000,759 A * | 1/1977 | Higbee | | 138/130 |
| 4,114,901 A * | 9/1978 | Pot | | 277/646 |
| 4,203,476 A * | 5/1980 | Vitellaro | | 138/122 |
| 4,241,763 A * | 12/1980 | Antal et al. | | 138/127 |
| 4,459,168 A * | 7/1984 | Anselm | | 156/143 |
| 4,989,643 A * | 2/1991 | Walton et al. | | 138/126 |
| 5,062,456 A * | 11/1991 | Cooke et al. | | 138/125 |
| 5,377,736 A * | 1/1995 | Stech | | 277/414 |
| 5,873,608 A * | 2/1999 | Tharp et al. | | 285/114 |
| 6,105,621 A * | 8/2000 | Primich | | 138/133 |
| 6,360,619 B1 * | 3/2002 | Schultz, Jr. | | 73/863.86 |
| 6,742,545 B2 * | 6/2004 | Fisher et al. | | 138/137 |
| 6,786,487 B2 * | 9/2004 | Dinc et al. | | 277/355 |
| 7,147,230 B2 * | 12/2006 | Rowe | | 277/583 |
| 2006/0032647 A1 * | 2/2006 | Petty | | 173/169 |
| 2006/0134361 A1 * | 6/2006 | Niki | | 428/36.91 |

* cited by examiner

*Primary Examiner* — Alison K Pickard
(74) *Attorney, Agent, or Firm* — Ronald J. Koch

(57) ABSTRACT

A method for facilitating the installation of labyrinth packing comprises the step of using pressurized air to extend the packing segments of a portion of a disassembled rotor casing to the close clearance position.

16 Claims, 4 Drawing Sheets

SYSTEM AND METHOD FOR FACILITATING TURBINE LABYRINTH PACKING

CLAIM OF PRIORITY BASED ON COPENDING APPLICATION claims benefit of utility application Ser. No. 11/673,814 filed on Feb. 12, 2007 and provisional application No. 60/773,020 filed Feb. 14, 2006.

The present application is related to the Provisional patent application No. 60/773,020 of Donna L. MacGregor, et al, filed Feb. 14, 2006, entitled "Labyrinth Packing Installation Facilitator", and based on which priority is herewith claimed under 35 U.S.C. 119(e) and the disclosure of which is incorporated herein by reference in its entirety.

The present application is a continuation of the co-pending patent application Ser. No. 11/673,814 Donna L. MacGregor, et al, filed Feb. 12, 2007, entitled "System And Method For Facilitating Turbine Labyrinth Packing", which claims the benefit of Provisional patent application No. 60/773,020 of Donna L. MacGregor, et al, filed Feb. 14, 2006, entitled "Labyrinth Packing Installation Facilitator", and based on which priority is herewith claimed under 35 U.S.C. 119(e) & 120 and the disclosures of which are incorporated herein by reference in their entirety as if fully rewritten herein.

CROSS REFERENCE TO RELATED APPLICATIONS

Not Applicable

FEDERALLY SPONSORED RESEARCH

Not Applicable

SEQUENCE LISTING, TABLE, OR COMPUTER PROGRAM COMPACT DISK APPENDIX

Not Applicable

BACKGROUND

The present invention relates generally to steam turbine calibration. Specifically, the invention relates to systems and methods of installing and calibrating packing rings (i.e. turbine packing) which surround turbine shafts.

When installing turbine packing, it is first necessary to load the packing in the holders with the original springs installed in the lower and upper halves. With the rotor removed and the upper half of the casings overturned to allow access to the upper half, segments for each ring of packing are installed into the packing holders of the upper and lower halves. The springs are difficult to install and remove, due to the spring stiffness necessary to hold the weight of the packing segments in their close clearance position during operation, and often require significant force to install and remove, depending on the size and weight of the packing segments.

The springs are necessary in order to hold the packing segments in their operational position against the hooks of the packing holders and to enable the measurements for the amount of material to be machined off of the packing segment butts in order to create radial clearances to accommodate thermal expansion of the packing rings during operation.

The upper half packing is measured to determine the exact location of the upper half packing pin slots. The pins are necessary in order to keep the packing from rotating during operation, and from falling out during assembly and disassembly of the upper half. All segments are then unloaded and the butts and pin slots machined for the specific radial and circumferential clearances. After machining, the segments are again reloaded in the packing holders with springs in the upper and lower halves and the pins installed in the upper halves. This necessary procedure is very time consuming, since there may be from 10 to 100 rings or more of packing to install.

Non-retractable packing segments have associated packing springs behind them (against the packing holder) during operation. The retractable packing segments have associated packing springs situated circumferentially between the packing segments (i.e. between packing butts). Retractable packing replaces the spring normally located behind the conventional packing ring segments with coil springs located in holes machined in the butts of the packing segments.

The coil springs in retractable packing cause the packing segments to move radially away from the shaft (in operation), taking up the amount of space between the back side of the packing ring and the packing holder. As steam flow increases, the steam pressure behind the packing overcomes the spring and friction forces, causing the packing to close (i.e. move towards the rotor in a close clearance position). The packing segments will then be operating with design clearance.

With "sensitized packing", sensitized springs are positioned radially behind the packing segments with one spring circumferentially between the top segments. The packing "floats" on these springs. The upper packing ring segments are isolated from the lower segments by keys at the horizontal joint to minimize necessary spring forces. Sensitized packing rings have the ability to provide a seal with reduced rubbing forces when compared to conventional rings.

SUMMARY

The present invention (packing facilitator) is a system and method that obviates the time necessary to install the springs (whether coil or flat) for the initial measurements for the butt and pin machining, thereby reducing the installation time required by approximately 50% and a reduction in labor costs. The primary function is to expedite the measurement process and minimize the effort necessary to obtain accurate machining data. The tool is primarily used in 180 degrees of the packing bores and can be effective for multiple ring applications (i.e. multiple rows of 180 degree segments).

The invention can be used with either conventional (non-retractable), sensitized, or retractable packing segments. It consists of a pressure regulator (preferably a "Mini Pressure Regulator") assembly with a pressure gage and a quick disconnect on the outlet side, a jacketed pneumatic tube (preferably in variations of three lengths of jacketed pneumatic tubing 18 inches, 6 feet and 20 feet long), each with a male connector. The 18 inch and 6 foot lengths contain an internal steel strip for stability. The varied tubing lengths are provided to reduce the time required to record necessary packing measurements for the various packing designs during installation of new and existing packing segments.

When measuring for packing butt clearances, the tubing should be installed in the packing bores before installing the packing. When radial measurements are recorded for retractable packing, the packing segments should be installed first and the tubing inserted behind the packing segments. For either measurement, the packing segments are installed without springs.

The closed end of the tube is inserted into the packing groove of the casing or holder, with the male connector assembly exposed above the horizontal joint.

The male connector assembly is attached to the female quick connect of the regulator assembly. The regulator knob is unlocked by pulling the knob away from the regulator. The regulator adjusting knob is turned counterclockwise until no load resistance is felt on the regulating spring before connecting to station air supply (i.e. pressurized air supply).

The tube is then pressurized until the desired outlet pressure is reached that causes the tubing to move all the packing segments into the closed, operating position. Doing so is essential for accurate measurements. At this point, the necessary packing measurements are made. When measurements are complete, the tube is de-pressurized and the tubing is moved to the next row of packing to be measured.

This procedure is repeated for each row to be measured thus avoiding the significant time required to install and remove springs to obtain the packing butt measurements for conventional and sensitized packing. Additionally, for retractable packing, the invention reduces the time required for butts, radial and axial measurements.

DETAILED DESCRIPTION

Figure 1:
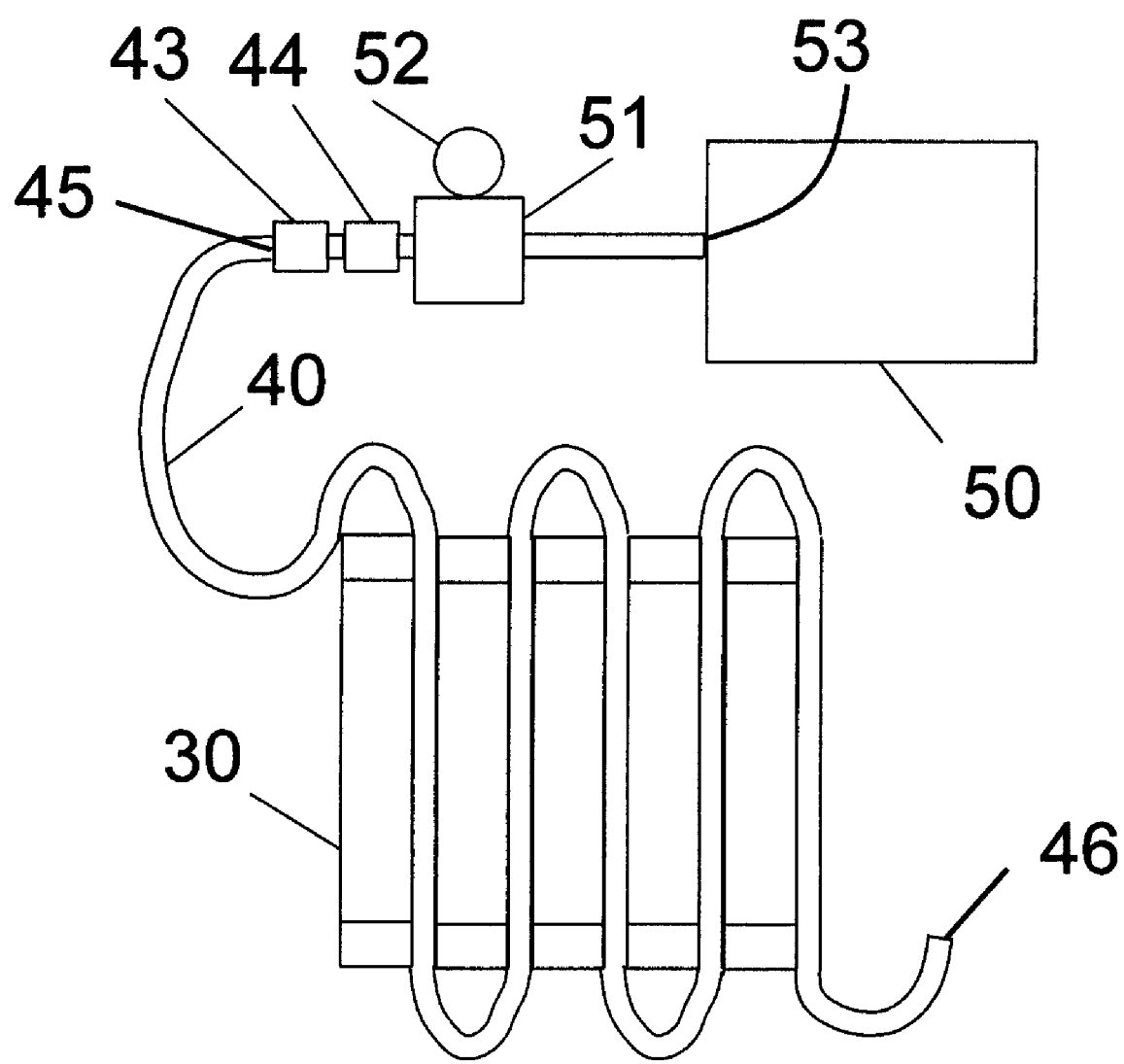
FIG. 1 Schematic of system.

One embodiment (FIG. 1) of a system for facilitating labyrinth packing installation comprises flexible pneumatic tube 40, pneumatic pressure regulator 51, male and female quick disconnect fittings, 43 and 44, and pressurized air supply source 50. It is to be understood that the terms "hose", "tube", "flexible pneumatic hose", and "flexible pneumatic tube" are interchangeable as used herein.

Tube 40 is elongate, similar to a garden hose, and can be made of rubber, nylon, or any suitable material that allows it to be pressurized with air. It can be made of varying lengths to suit the application, with typical preferred lengths made as 18 inches, 6 feet or 20 feet. It has first and second ends, 46 and 45. First end 46 is sealed. The expansion of the inflating tube exerts a force which can be used to extend turbine packing.

Male quick disconnect fitting 43 is attached by a hose clamp to second end 45 of tube 40. Female quick disconnect fitting 44 is operatively connected to pneumatic pressure regulator 51 on its outlet side. It is to be understood that the male and female disconnect fittings are complementary, being a set that fit together to form a fluid tight seal. As such, they may be interchangeably used with each other. The male and female disconnects are engaged together in assembly of the system, to join the regulator outlet and tube second end 45.

Pneumatic pressure regulator 51 includes pressure gauge 52. The pneumatic pressure regulator can be a type commonly used for manually adjustable control of compressed air. Preferably, the regulator is self-relieving, and rated for 40 psig. Pneumatic pressure regulator 51 is in fluid communication with pressurized air supply source 50. The regulator is used to inflate tube 40 to the desired pressure.

Figure 5:
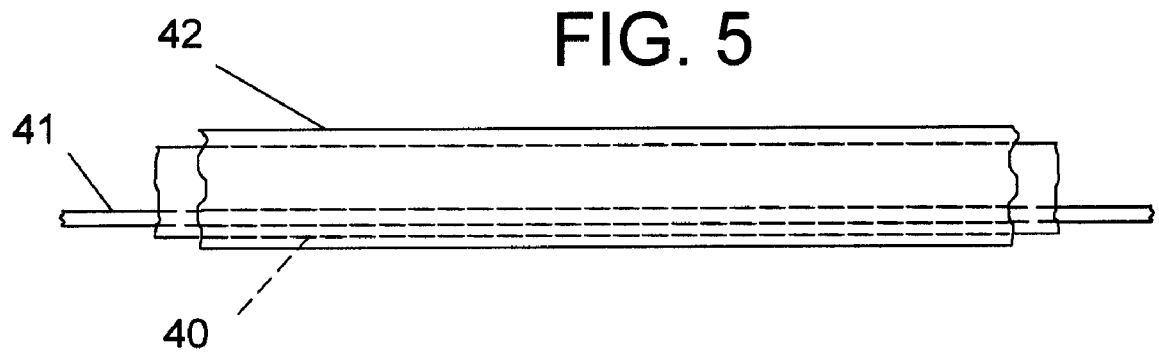
FIG. 5 Fragmented side view of hose, hose sleeve, and hose stabilizer.
Figure 6:
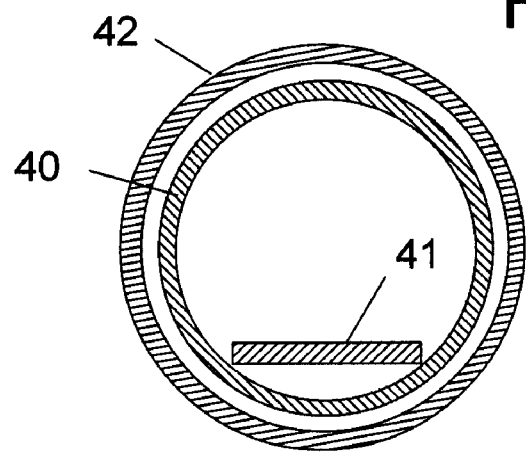
FIG. 6 Cross sectional view of hose, hose sleeve, and hose stabilizer.

In some embodiments (FIGS. 5 and 6), flexible pneumatic tube 40 has pliable metal strip 41 within and is encased by woven fabric sleeve 42. Metal strip 41 provides added rigidity to hose 40 so as to facilitate insertion of hose 40 behind packing or into packing bores. Use of metal strip 40 and sleeve 42 is preferred, but not necessary to practice the invention.

Sleeve 42 is elongate, preferably the same length as tube 40, and capable of enclosing it. Sleeve 42 serves as a protective jacket to prevent punctures and wear of tube 40. The sleeve may be made of Kevlar (trademark) or canvas, or any suitable protective material.

Figure 2:
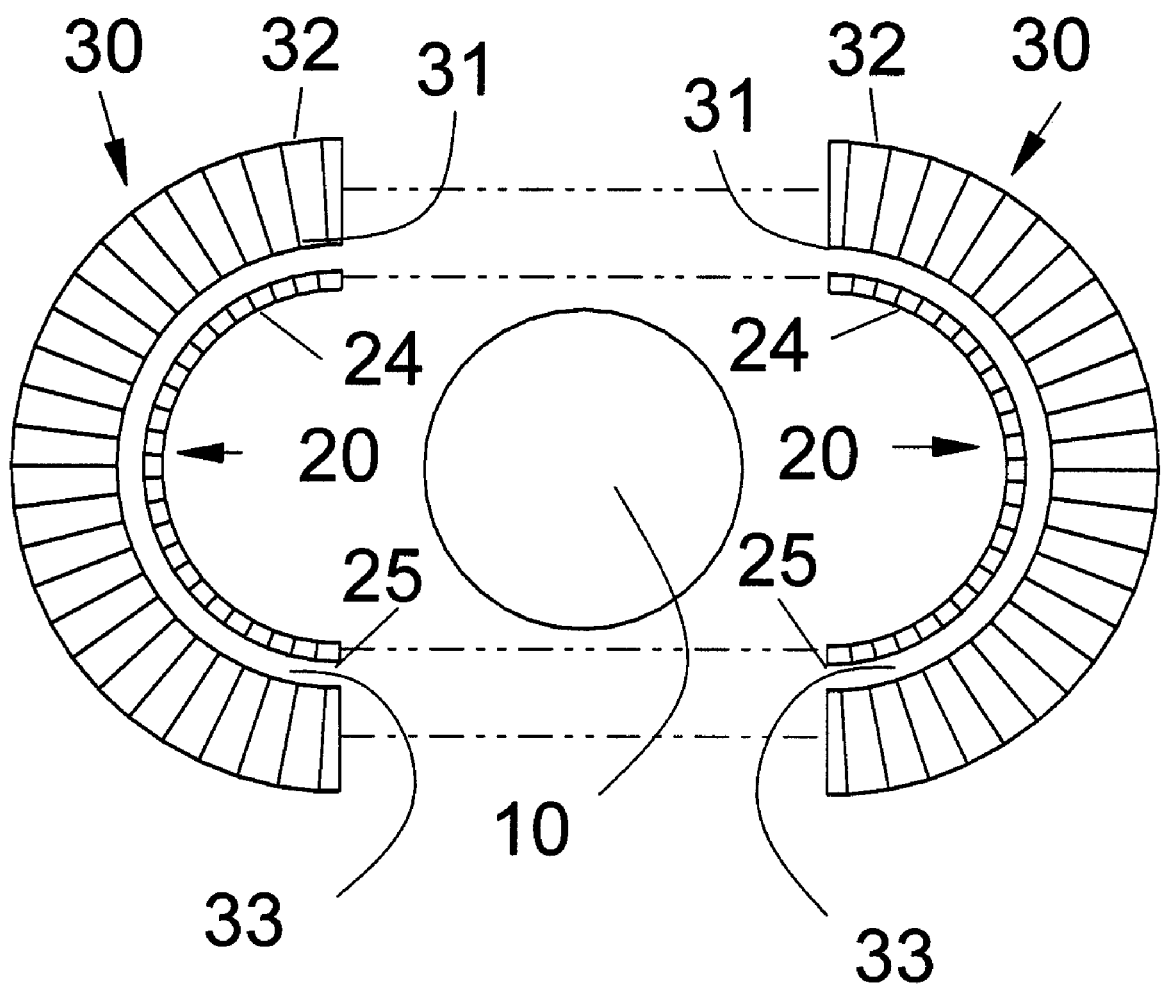
FIG. 2 Exploded, cross sectional view of segmented packing and packing holder around the turbine rotor.

The invention is to be used in conjunction with a disassembled rotor casing of a non-operational turbine system. In other words, the turbine is disassembled for maintenance. As shown in FIG. 2. the turbine system includes a turbine rotor 10 and a rotor casing (not shown) that surrounds rotor 10. The rotor casing includes turbine packing 20 and packing holder 30 installed between the rotor and the casing. Thus, packing 20 coaxially surrounds the rotor in close proximity to it and is housed within packing holder 30 which is attached to the casing. FIG. 2 depicts vertically segmented packing halves for ease of illustration. However, in practice the segmentation is horizontal.

For maintenance, the casing is disassembled into halves and separated from the turbine rotor thus exposing the packing. The packing can then be removed from the packing holder for replacement or maintenance of the packing. It is to be understood that the terms "packing" and "packing assembly" can include packing and packing holders collectively or individually, and that "packing" is comprised of packing segments.

Figure 3:
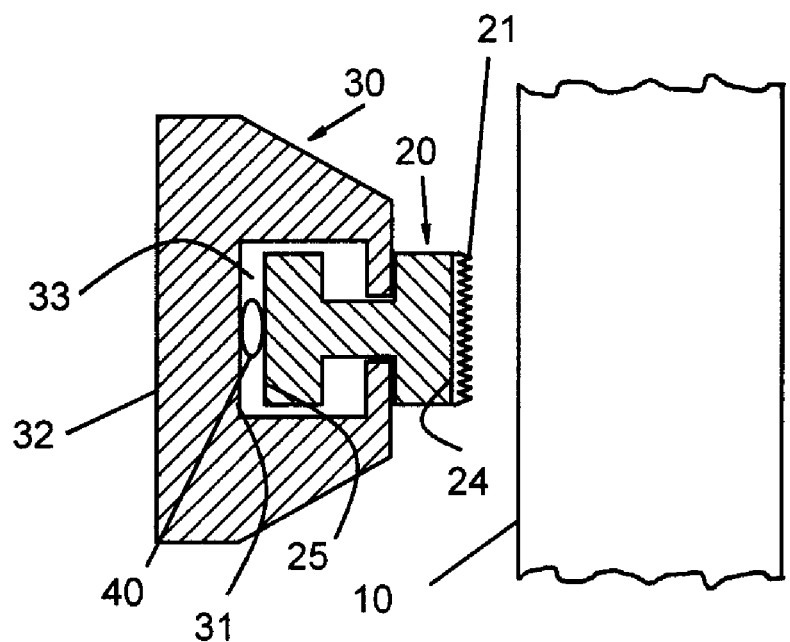
FIG. 3 Cross sectional side view of invention with packing in retracted position.
Figure 4:
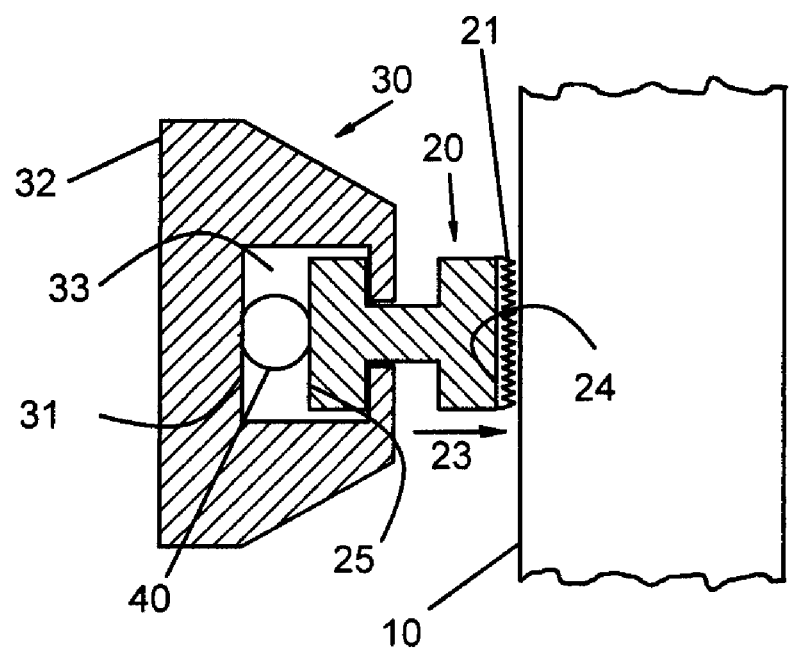
FIG. 4 Cross sectional side view of invention with packing in extended position.

Packing 20, for conventional and sensitized packing designs, has an operational close clearance position (FIG. 4) created by spring forces, and a retracted non operational position (FIG. 3) when the springs are removed. Retractable packing springs cause the packing to be in the non operational position (FIG. 3) during start up of the turbine and the increasing steam forces cause the packing to close to the operational close clearance position (FIG. 4). It is to be understood that extending the packing towards a close clearance (or operational) position means causing the packing to move away from the packing holder in order to simulate the operational condition of the packing being in close proximity to a rotor with the casing being assembled around the rotor and that the packing can be extended to this position even when the casing is disassembled. Thus, extending the packing in this manner necessarily implies the packing also be extended away from the casing.

Generally, the present invention accomplishes this extension by inflatable hose 40 being positioned between packing 20 and packing holder 30 (and therefore necessarily between the packing and the casing) and then being inflated. As depicted in FIG. 4, the inflated hose forces the packing away (as indicated by arrow 23) from the packing holder (and casing) into a close clearance position.

When the rotor casing is disassembled into halves for maintenance, the packing is situated such that it does not surround to the rotor (i.e. covers less than 360 degrees of the rotor). Hose 40 is positioned behind the packing and the disassembled casing so as to be inflated. Thus, to practice the invention, hose 40 does not surround rotor 10, nor does it serve to provide a seal around it. As used, the invention is not practiced on an operational rotor. It can only be practiced on a non-operational rotor.

One embodiment of a method for facilitating labyrinth packing comprises the steps of: with a rotor 10 in place but non-operational, the rotor having associated therewith packing 20, the packing comprising packing segments with associated packing springs removed from behind the packing segments, first inserting the flexible pneumatic tube 40 into the packing holder 30 behind the packing segments 20, then raising packing 20 to the close clearance position by inflating flexible pneumatic tube 40 with pressurized air supply source 50.

One embodiment of a method for facilitating labyrinth packing comprises using pressurized air to extend the packing segments 20 of a portion of a disassembled rotor casing to the close clearance position.

One embodiment of a method for facilitating labyrinth packing comprises the steps of: Using pressurized air to extend the packing segments 20 of a portion of a disassembled rotor casing to the close clearance position by positioning the flexible pneumatic tube 40 between the packing segments 20 and the rotor casing, then inflating the flexible pneumatic tube 40 with pressurized air.

One embodiment of a method for facilitating labyrinth packing comprises the steps of: in conjunction with a system having a rotor 10, and a packing assembly 20,30 surrounding the rotor and being comprised of packing holders 30 with packing segments 20 positioned within, the packing segments having an operational close clearance position and a refracted non operational position, the system further having a rotor casing surrounding and being connected to the packing holder 30, the rotor casing comprising upper and lower halves, with the rotor 10 removed and the casing halves disassembled so as to allow access thereto, first positioning inflatable pneumatic tube 40 behind 180 degrees of packing segments 20, and then inflating tube 40 so as to extend the 180 degrees of packing segments 20 into their operational close clearance position.

One embodiment of the foregoing method comprises first inserting the inflatable pneumatic tube 40 into the packing holder 30 then installing the 180 degrees of packing segments.

One embodiment of the foregoing method comprises inserting the inflatable pneumatic tube into the packing holder behind the 180 degrees of packing segments.

The foregoing methods of facilitating the installation of labyrinth packing are practiced utilizing a system comprising: a flexible pneumatic tube 40 having first and second ends 46 & 45, the first end 46 being sealed; the flexible pneumatic tube 40 being encased by a woven fabric sleeve 42; a pneumatic pressure regulator 51 having a pressure gauge 52, and male and female quick disconnect fittings 43 & 44; the pneumatic pressure regulator 51 being in fluid communication with a pressurized air supply source 50; the male quick disconnect fitting 43 being attached by a hose clamp to the second end 45 of the flexible pneumatic tube 40; and the female quick disconnect fitting 44 being operatively connected to the pneumatic pressure regulator 51.

Some embodiments of the foregoing system comprise the flexible pneumatic tube 40 having a pliable metal strip 41 within. Some embodiments of the foregoing system comprise the pneumatic pressure regulator 51 having a 40 pound pneumatic pressure regulator. Some embodiments of the foregoing system comprise the pneumatic pressure regulator 51 having an adjustable, self-relieving pressure regulator and pressure gage.

What is claimed is:

1. A system for facilitating labyrinth packing installation comprising:
   a tube assembly consisting of one flexible pneumatic tube having a first sealed end, a second open end, one exterior surface, and one interior surface that forms an inner-most cavity, one woven fabric sleeve surrounding the exterior surface of the flexible pneumatic tube, and one pliable metal strip within the inner-most cavity of the flexible pneumatic tube;
   a pneumatic pressure regulator comprising a pressure gauge, and male and female quick disconnect fittings;
   the pneumatic pressure regulator being in fluid communication with a pressurized air supply source;
   the male quick disconnect fitting being attached by a hose clamp to the second end of the flexible pneumatic tube;
   the female quick disconnect fitting being operatively connected to the pneumatic pressure regulator;
   whereby the tube assembly can be positioned so as to extend the packing segments in a disassembled rotor casing into a close clearance position for calibration for operational expansion clearance measurements purposes.

2. The system of claim 1 wherein
   the pneumatic pressure regulator comprises a 40 pound pneumatic pressure regulator.

3. The system of claim 1 wherein
   the pneumatic pressure regulator comprises an adjustable, self-relieving pressure regulator and pressure gage.

4. A method for facilitating the installation of labyrinth packing comprising the steps of:
   providing a labyrinth packing installation facilitator comprising,
      a tube assembly consisting of one flexible pneumatic tube having a first sealed end, a second open end, one exterior surface, and one interior surface that forms an inner-most cavity, one woven fabric sleeve surrounding the exterior surface of the flexible pneumatic tube, and one pliable metal strip within the inner-most cavity of the flexible pneumatic tube;
      a pneumatic pressure regulator comprising a pressure gauge, and male and female quick disconnect fittings,
      the pneumatic pressure regulator being in fluid communication with a pressurized air supply source,
      the male quick disconnect fitting being attached by a hose clamp to the second end of the flexible pneumatic tube,
      the female quick disconnect fitting being operatively connected to the pneumatic pressure regulator;
   with a rotor in place but non-operational, the rotor having associated therewith packing, the packing comprising packing segments with associated packing springs removed from behind the packing segments, first inserting the tube assembly into the packing holder behind the packing segments;
   then raising the packing segments to the close clearance position by inflating the tube assembly with the pressurized air supply source;
   whereby operational conditions can be simulated;
   further whereby clearances of the packing can be measured.

5. The method of claim 4 wherein
   the pneumatic pressure regulator comprises a 40 pound pneumatic pressure regulator.

6. The method of claim 4 wherein
   the pneumatic pressure regulator comprises an adjustable, self-relieving pressure regulator and pressure gage.

7. A method for facilitating the installation of labyrinth packing comprising the steps of:
   providing a labyrinth packing installation facilitator comprising, a tube assembly consisting of one flexible pneumatic tube having a first sealed end, a second open end, one exterior surface, and one interior surface that forms an inner-most cavity, one woven fabric sleeve surrounding the exterior surface of the flexible pneumatic tube, and one pliable metal strip within the inner-most cavity of the flexible pneumatic tube;

a pneumatic pressure regulator comprising a pressure gauge, and male and female quick disconnect fittings, the pneumatic pressure regulator being in fluid communication with a pressurized air supply source, the male quick disconnect fitting being attached by a hose clamp to the second end of the flexible pneumatic tube, the female quick disconnect fitting being operatively connected to the pneumatic pressure regulator;

in a portion of a disassembled rotor casing, positioning the tube assembly between the packing segments and the rotor casing, then inflating the tube assembly with pressurized air;

whereby operational conditions can be simulated;

further whereby the packing can be calibrated for operational expansion clearance measurements.

8. The method of claim 7 wherein the pneumatic pressure regulator comprises a 40 pound pneumatic pressure regulator.

9. The method of claim 7 wherein the pneumatic pressure regulator comprises an adjustable, self-relieving pressure regulator and pressure gage.

10. A method for facilitating labyrinth packing comprising the steps of:

providing a tube assembly consisting of one flexible pneumatic tube having a first sealed end, a second open end, one exterior surface, and one interior surface that forms an inner-most cavity, one woven fabric sleeve surrounding the exterior surface of the flexible pneumatic tube, and one pliable metal strip within the inner-most cavity of the flexible pneumatic tube;

the second end of the flexible pneumatic tube being in fluid communication with a pressurized air source;

in conjunction with a system having a rotor, and a packing assembly surrounding the rotor and comprising packing holders with packing segments positioned within, the packing segments having an operational close clearance position and a retracted non operational position, the system further having a rotor casing surrounding and being connected to the packing holder, the rotor casing comprising upper and lower halves, with the rotor removed and the casing halves disassembled so as to allow access thereto, first positioning the tube assembly behind 180 degrees of packing segments, then inflating the tube assembly to extend the 180 degrees of packing segments into their operational close clearance position.

11. The method of claim 10 wherein the tube assembly is 18 inches in length.

12. The method of claim 10 wherein the tube assembly is 6 feet in length.

13. The method of claim 10 wherein the tube assembly is 20 feet in length.

14. The method of claim 10 wherein the step of first positioning the tube assembly behind 180 degrees of packing segments further comprises:

first inserting the tube assembly into the packing holder then installing the 180 degrees of packing segments.

15. The method of claim 10 wherein the step of first positioning tube assembly behind 180 degrees of packing segments further comprises:

inserting the tube assembly into the packing holder behind the 180 degrees of packing segments.

16. The method of claim 10 wherein the system further comprises a male quick disconnect being attached to the second end of the tube assembly and a complementary female quick disconnect being operatively connected to a pressure regulator, the pressure regulator being in fluid communication with a pressurized air source;

the step of inflating the tube assembly further comprising engaging the male and female quick disconnects, then opening the pressure regulator to inflate the tube assembly.

* * * * *